(12) United States Patent
Kim et al.

(10) Patent No.: US 10,403,934 B2
(45) Date of Patent: Sep. 3, 2019

(54) NON-AQUEOUS ELECTROLYTE SOLUTION AND LITHIUM SECONDARY BATTERY INCLUDING THE SAME

(71) Applicant: LG Chem, Ltd., Seoul (KR)

(72) Inventors: Gwang Yeon Kim, Daejeon (KR); Young Min Lim, Daejeon (KR); Chul Haeng Lee, Daejeon (KR); Min Jung Kim, Daejeon (KR); Ha Eun Kim, Daejeon (KR)

(73) Assignee: LG Chem, Ltd. (KR)

(*) Notice: Subject to any disclaimer, the term of this patent is extended or adjusted under 35 U.S.C. 154(b) by 150 days.

(21) Appl. No.: 15/574,665

(22) PCT Filed: Sep. 30, 2016

(86) PCT No.: PCT/KR2016/011006
§ 371 (c)(1),
(2) Date: Nov. 16, 2017

(87) PCT Pub. No.: WO2017/057968
PCT Pub. Date: Apr. 6, 2017

(65) Prior Publication Data
US 2018/0138547 A1  May 17, 2018

(30) Foreign Application Priority Data

Sep. 30, 2015 (KR) .................. 10-2015-0138039
Sep. 30, 2015 (KR) .................. 10-2015-0138040
Sep. 29, 2016 (KR) .................. 10-2016-0125915

(51) Int. Cl.
| | | |
|---|---|---|
| *H01M 6/16* | (2006.01) |
| *H01M 10/0564* | (2010.01) |
| *C08K 3/26* | (2006.01) |
| *H01M 10/0525* | (2010.01) |
| *H01M 4/62* | (2006.01) |
| *H01M 4/505* | (2010.01) |
| *H01M 4/525* | (2010.01) |
| *H01M 10/0567* | (2010.01) |
| *H01M 10/0568* | (2010.01) |
| *H01M 10/0569* | (2010.01) |
| *H01M 4/131* | (2010.01) |

(52) U.S. Cl.
CPC ........... *H01M 10/0564* (2013.01); *C08K 3/26* (2013.01); *H01M 4/505* (2013.01); *H01M 4/525* (2013.01); *H01M 4/623* (2013.01); *H01M 10/0525* (2013.01); *H01M 10/0567* (2013.01); *H01M 10/0568* (2013.01); *H01M 10/0569* (2013.01); *H01M 4/131* (2013.01); *H01M 2300/0034* (2013.01); *H01M 2300/0037* (2013.01)

(58) Field of Classification Search
CPC ...... H01M 4/505; H01M 4/525; H01M 4/623; H01M 4/131; H01M 10/0564; H01M 10/0525; H01M 10/052; H01M 10/0567; H01M 10/0568; H01M 10/0569; H01M 2300/0034; H01M 2300/0037; C08K 3/26
See application file for complete search history.

(56) References Cited

U.S. PATENT DOCUMENTS

| | | | |
|---|---|---|---|
| 9,627,712 B2 | 4/2017 | Cheng et al. | |
| 2010/0266905 A1 | 10/2010 | Jeon et al. | |
| 2011/0081583 A1* | 4/2011 | Sugimoto | H01M 2/145 429/346 |
| 2012/0077076 A1 | 3/2012 | Cheng et al. | |
| 2014/0220417 A1 | 8/2014 | Cheng et al. | |
| 2014/0349198 A1 | 11/2014 | Lim et al. | |
| 2015/0140446 A1* | 5/2015 | Li | H01M 10/0567 429/332 |
| 2017/0204124 A1 | 7/2017 | Takahashi et al. | |

FOREIGN PATENT DOCUMENTS

| | | |
|---|---|---|
| EP | 3165528 A1 | 5/2017 |
| JP | 2004-146071 A | 5/2004 |
| JP | 2010-123265 A | 6/2010 |
| JP | 2014-194870 A | 10/2014 |
| JP | 2016027028 A | 2/2016 |
| JP | 2016201244 A | 12/2016 |
| KR | 2009-0030237 A | 3/2009 |
| KR | 2014-0018461 A | 2/2014 |
| KR | 2014-0139442 A | 12/2014 |
| KR | 20170021335 A | 2/2017 |

(Continued)

OTHER PUBLICATIONS

International Search Report From PCT/KR2016/011006 dated Jan. 10, 2017.

(Continued)

*Primary Examiner* — Raymond Alejandro
(74) *Attorney, Agent, or Firm* — Lerner, David, Littenberg, Krumholz & Mentlik, LLP

(57) ABSTRACT

The present invention relates to a non-aqueous electrolyte solution including a non-aqueous organic solvent, lithium bis(fluorosulfonyl)imide (LiFSI), and a pyridine-based compound represented by Formula 1, and a lithium secondary battery including the same.

The lithium secondary battery of the present invention including the non-aqueous electrolyte solution of the present invention may exhibit excellent low-temperature and room-temperature output characteristics, high-temperature and room-temperature cycle characteristics, and capacity characteristics after high-temperature storage.

18 Claims, No Drawings

(56) References Cited

FOREIGN PATENT DOCUMENTS

WO    WO 2015/010931    *  1/2015  .......... H01M 10/052
WO    2016-002774 A1    1/2016

OTHER PUBLICATIONS

Extended European Search Report including Written Opinion for Application No. EP16852114.4 dated Jul. 4, 2018.
Ilyin E G et Al., "Reactions of phosphorus and tantalum pentafluorides with picolinic acid", Doklady Akademii Nauk SSSR = Comptes Rendus De L'Academie Des Sciences De L'Urss, Akademija Nauk SSSR, RU, Jan. 1, 1985, vol. 283, No. 4, pp. 904-907, XP008185538.

* cited by examiner

NON-AQUEOUS ELECTROLYTE SOLUTION AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2016/011006, filed Sep. 30, 2016, which claims priority to Korean Patent Application Nos. 10-2015-0138039 and 10-2015-0138040, filed on Sep. 30, 2015, and 10-2016-0125915, filed on Sep. 29, 2016, in the Korean Intellectual Property Office, the disclosures of which are incorporated herein by reference.

TECHNICAL FIELD

The present invention relates to a non-aqueous electrolyte solution including a non-aqueous organic solvent, lithium bis(fluorosulfonyl)imide (LiFSI), and a pyridine-based compound represented by Formula 1, and a lithium secondary battery including the same.

BACKGROUND ART

Demand for secondary batteries as an energy source has been significantly increased as technology development and demand with respect to mobile devices have increased. Among these secondary batteries, lithium secondary batteries having high energy density and high voltage have been commercialized and widely used.

A lithium metal oxide is used as a positive electrode active material of a lithium secondary battery, and a lithium metal, a lithium alloy, crystalline or amorphous carbon, or a carbon composite is used as a negative electrode active material. A current collector may be coated with the active material of appropriate thickness and length or the active material itself may be coated in the form of a film, and the resultant product is then wound or stacked with an insulating separator to prepare an electrode assembly. Thereafter, the electrode assembly is put into a can or a container similar thereto, and a secondary battery is then prepared by injecting an electrolyte solution.

Charge and discharge of the lithium secondary battery is performed while a process of intercalating and deintercalating lithium ions from a lithium metal oxide positive electrode into and out of a graphite negative electrode is repeated. In this case, since lithium is highly reactive, lithium reacts with the carbon electrode to form $Li_2CO_3$, LiO, or LiOH, and thus, a film may be formed on the surface of the negative electrode. The film is denoted as "solid electrolyte interface (SEI)", wherein the SEI formed at an initial stage of charging may prevent a reaction of the lithium ions with the carbon negative electrode or other materials during charge and discharge. Also, the SEI may only pass the lithium ions by acting as an ion tunnel. The ion tunnel may prevent the collapse of a structure of the carbon negative electrode due to the co-intercalation of the carbon negative electrode and organic solvents of an electrolyte solution having a high molecular weight which solvates lithium ions and moves therewith.

Therefore, in order to improve high-temperature cycle characteristics and low-temperature output of the lithium secondary battery, a robust SEI must be formed on the negative electrode of the lithium secondary battery. When the SEI is once formed during the first charge, the SEI may prevent the reaction of the lithium ions with the negative electrode or other materials during repeated charge and discharge cycles caused by the subsequent use of the battery, and the SEI may act as an ion tunnel that only passes the lithium ions between the electrolyte solution and the negative electrode.

Various non-aqueous organic solvents have been used in electrolyte solutions. For example, propylene carbonate is mainly being used as a non-aqueous organic solvent, but the propylene carbonate may cause an irreversible decomposition reaction with a graphite material. In order to replace the propylene carbonate, binary and tertiary non-aqueous organic solvents based on ethylene carbonate (EC) have been used. However, since EC has a high melting point, its operating temperature may be limited and battery performance may be significantly reduced at a low temperature.

DISCLOSURE OF THE INVENTION

Technical Problem

The present invention provides a non-aqueous electrolyte solution which may improve room-temperature and high-temperature cycle characteristics and capacity characteristics after high-temperature storage as well as low-temperature and room-temperature output characteristics, and a lithium secondary battery including the same.

Technical Solution

According to an aspect of the present invention, there is provided a non-aqueous electrolyte solution including: a non-aqueous organic solvent, lithium bis(fluorosulfonyl)imide (LiFSI), and a pyridine-based compound represented by Formula 1.

[Formula 1]

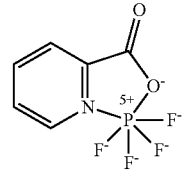

According to another aspect of the present invention, there is provided a lithium secondary battery including: a positive electrode including a positive electrode active material; a negative electrode including a negative electrode active material; a separator disposed between the positive electrode and the negative electrode; and the non-aqueous electrolyte solution, wherein the positive electrode active material includes a manganese spinel-based active material, a lithium metal oxide, or a mixture thereof.

Advantageous Effects

Since a non-aqueous electrolyte solution of the present invention may form a robust solid electrolyte interface (SEI) on a negative electrode during initial charge of a lithium secondary battery including the same, high-temperature and room-temperature cycle characteristics and capacity characteristics after high-temperature storage as well as low-temperature and room-temperature output characteristics may be improved.

MODE FOR CARRYING OUT THE INVENTION

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A non-aqueous electrolyte solution of the present invention includes a non-aqueous organic solvent, lithium bis(fluorosulfonyl)imide (LiFSI), and a pyridine-based compound represented by Formula 1.

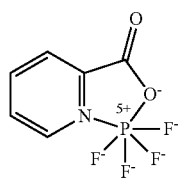

[Formula 1]

Since the non-aqueous electrolyte solution may form a robust solid electrolyte interface (SET) on a negative electrode during initial charge by including lithium bis(fluorosulfonyl)imide in a non-aqueous organic solvent, the non-aqueous electrolyte solution may not only improve low-temperature and room-temperature output characteristics, but also may inhibit decomposition of a surface of a positive electrode, which may occur during a high-temperature cycle at 45° C. or more, and may prevent an oxidation reaction of the electrolyte solution. Thus, capacity characteristics of a lithium secondary battery may be simultaneously improved.

Also, since the non-aqueous electrolyte solution includes a pyridine-based compound represented by Formula 1, the pyridine-based compound represented by Formula 1 is decomposed upon activation, participates in the formation of the SEII on the negative electrode to form a robust interface, and allows the SEI to be thinly formed while increasing density of the SEI, and thus, life characteristics and durability during high-temperature storage of the battery may be improved.

An amount of the pyridine-based compound represented by Formula 1 may be in a range of 0.01 wt % to 3 wt %, particularly 0.05 wt % to 2 wt %, and more particularly 0.6 wt % to 1.5 wt %, based on total weight of the non-aqueous electrolyte solution.

In a case in which the amount of the pyridine-based compound represented by Formula 1 is 0.01 wt % or more, an appropriate effect due to the addition of the pyridine-based compound may be expected, and, in a case in which the amount of the pyridine-based compound is 3 wt % or less, problems, for example, an increase in irreversible capacity of the battery, or an increase in resistance of the electrode due to the formation of a thick SET, may be prevented while having a moderate effect.

The non-aqueous organic solvent may be used without limitation as long as it may minimize the decomposition due to the oxidation reaction during charge and discharge of the battery and may exhibit desired characteristics with the additive. For example, the non-aqueous organic solvent may include a nitrile-based solvent, cyclic carbonate, linear carbonate, ester, ether, or ketone. These materials may be used alone or in combination of two or more thereof.

Among the above organic solvents, carbonate-based organic solvents may be easily used. Examples of the cyclic carbonate may be any one selected from the group consisting of ethylene carbonate (EC), propylene carbonate (PC), and butylene carbonate (BC), or a mixture of two or more thereof, and examples of the linear carbonate may be any one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

The nitrile-based solvent may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenyl acetonitrile, 2-fluorophenylacetonitrile, and 4-fluorophenylacetonitrile.

The ester may include ethyl propionate (EP), methyl propionate (MP), and a mixture thereof.

The non-aqueous electrolyte solution according to an example of the present invention may include propylene carbonate (PC) and ethylene carbonate (EC) as the non-aqueous organic solvent.

The ethylene carbonate (PC) has been mainly used as a non-aqueous organic solvent used in a non-aqueous electrolyte solution in a lithium secondary battery due to its excellent affinity with a carbon material. However, in a case in which EC is excessively used, since $CO_2$ gas may be generated due to the decomposition of the EC, performance of the secondary battery may not only be adversely affected, but also low-temperature characteristics may be poor due to high melting point characteristics and high output characteristics may be poor due to low conductivity.

In contrast, a non-aqueous electrolyte solution including propylene carbonate may have high output characteristics due to excellent low-temperature characteristics and high conductivity. However, since propylene carbonate may cause an irreversible decomposition reaction with a graphite material, the use thereof with graphite may be limited. Also, the reduction of the capacity of the lithium secondary battery may occur due to an exfoliation phenomenon of the electrode caused by the propylene carbonate during high-temperature cycles according to the thickness of the electrode.

In particular, in a case in which the propylene carbonate, as a non-aqueous organic solvent, is used with a lithium salt such as $LiPF_6$, an enormous amount of irreversible reaction may occur during a process of forming the SET in a lithium secondary battery using a carbon electrode and a process of intercalating lithium ions, which are solvated by the propylene carbonate, between carbon layers. This may cause the degradation of the battery performance such as cycle characteristics.

Also, when the lithium ions solvated by the propylene carbonate are intercalated into the carbon layers constituting the negative electrode, exfoliation of a carbon surface layer may proceed. The exfoliation may occur because gas, which is generated when the solvent decomposes between the carbon layers, causes a large distortion in the carbon layers. The exfoliation of the surface layer and the decomposition of the electrolyte solution may continuously proceed, and, as a result, since an effective SEI may not be formed when the electrolyte solution including propylene carbonate is used in combination with a carbon-based negative electrode material, lithium ions may not be intercalated.

Thus, in a case in which, as the non-aqueous organic solvent, the ethylene carbonate and the propylene carbonate are mixed so as to have an appropriate composition, output characteristics of the lithium secondary battery may be improved by improving conductivity characteristics of the non-aqueous electrolyte solution, low-temperature characteristics may be improved, and a non-aqueous electrolyte solution also having excellent electrochemical affinity with a carbon layer may be provided.

In order to address the limitations of the ethylene carbonate and the propylene carbonate and maximize the above-described advantages, the non-aqueous electrolyte solution according to the example of the present invention, for example, may include the propylene carbonate and the ethylene carbonate (EC) in a weight ratio of 1:0.1 to 1:2, particularly 1:0.3 to 1:1, and more particularly 1:0.4 to 1:0.9.

In a case in which the non-aqueous electrolyte solution includes the propylene carbonate (PC) and the ethylene carbonate (EC) in the above mixing ratio, the limitations occurring when the propylene carbonate (PC) and the ethylene carbonate (EC) are separately used may be addressed, and the advantages of each of these solvents may be maximized to produce a synergistic effect caused by the mixing of the non-aqueous organic solvents. According to an example of the present invention, the mixing ratio of the propylene carbonate and the ethylene carbonate (EC), as the non-aqueous organic solvent, may significantly affect the improvement of low-temperature and room-temperature output characteristics and capacity characteristics after high-temperature storage.

The non-aqueous electrolyte solution of the present invention may address the above-described limitations, which occur when using the propylene carbonate and the lithium salt, such as $LiPF_6$, together, by using the lithium bis(fluorosulfonyl)imide in combination therewith.

Specifically, since the lithium bis(fluorosulfonyl)imide, as a lithium salt, is added to the non-aqueous electrolyte solution to form a robust and stable SEI on the negative electrode, the lithium bis(fluorosulfonyl)imide may not only improve low-temperature output characteristics, but also may suppress the decomposition of the surface of the positive electrode, which may occur during high-temperature cycles, and may prevent the oxidation reaction of the electrolyte solution.

The propylene carbonate may be included in an amount of 5 parts by weight to 60 parts by weight, for example, 10 parts by weight to 40 parts by weight based on 100 parts by weight of the total non-aqueous organic solvent. In a case in which the amount of the propylene carbonate is less than 5 parts by weight, since gas may be continuously generated due to the decomposition of the surface of the positive electrode during the high-temperature cycles, a swelling phenomenon may occur in which a thickness of the battery increases. In a case in which the amount of the propylene carbonate is greater than 60 parts by weight, a robust SEI may be difficult to be formed on the negative electrode during the initial charge and high-temperature characteristics may be degraded.

In a case in which, within the above amount of the propylene carbonate used, the amount of the ethylene carbonate is appropriately adjusted to be within the range of the mixing ratio, an optimum effect on the capacity characteristics after high-temperature storage as well as the low-temperature and room-temperature output characteristics of the lithium secondary battery may be achieved.

The non-aqueous electrolyte solution may further include a non-aqueous organic solvent in addition to the propylene carbonate (PC) and the ethylene carbonate (EC), and the non-aqueous organic solvent is not limited as long as it may minimize the decomposition due to the oxidation reaction during the charge and discharge of the battery and may exhibit desired characteristics with additives.

Examples of the non-aqueous organic solvent, which may be further included the non-aqueous electrolyte solution, may be any one selected from the group consisting of ethyl propionate (EP), methyl propionate (MP), butylene carbonate (BC), dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

A concentration of the lithium bis(fluorosulfonyl)imide in the non-aqueous electrolyte solution may be in a range of 0.01 mol/L to 2 mol/L.

Specifically, when the non-aqueous electrolyte solution according to the example of the present invention includes the propylene carbonate (PC) and the ethylene carbonate (EC) as the non-aqueous organic solvent, the concentration of the lithium bis(fluorosulfonyl)imide in the non-aqueous electrolyte solution may be in a range of 0.1 mol/L to 2 mol/L, for example, 0.5 mol/L to 1.5 mol/L. In a case in which the concentration of the lithium bis(fluorosulfonyl)imide is less than 0.1 mol/L, effects of improving the low-temperature output and high-temperature cycle characteristics of the battery may be insignificant. In a case in which the concentration of the lithium bis(fluorosulfonyl)imide is greater than 2 mol/L, since a side reaction in the electrolyte solution may excessively occur during the charge and discharge of the battery, the swelling phenomenon may occur and corrosion of a positive electrode or negative electrode collector formed of a metal may occur in the electrolyte solution.

In order to further prevent the side reaction, the non-aqueous electrolyte solution of the present invention may further include a lithium salt in addition to the lithium bis(fluorosulfonyl)imide. Any lithium salt commonly used in the art may be used as the lithium salt, and, for example, the lithium salt may include any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and $LiC_4BO_8$, or a mixture of two or more thereof.

A mixing ratio of the lithium salt and the lithium bis(fluorosulfonyl)imide may be in a range of 1:0.01 to 1:9 as a molar ratio.

Specifically, when the non-aqueous electrolyte solution according to the example of the present invention includes the propylene carbonate (PC) and the ethylene carbonate (EC) as the non-aqueous organic solvent, the mixing ratio of the lithium salt and the lithium bis(fluorosulfonyl)imide may be in a range of 1:1 to 1:9 as a molar ratio. In a case in which the mixing ratio of the lithium salt and the lithium bis(fluorosulfonyl)imide is outside the above molar ratio range, since the side reaction in the electrolyte solution may excessively occur during the charge and discharge of the battery, the swelling phenomenon may occur.

Specifically, when the non-aqueous electrolyte solution according to the example of the present invention includes the propylene carbonate (PC) and the ethylene carbonate (EC) as the non-aqueous organic solvent, the mixing ratio of the lithium salt and the lithium bis(fluorosulfonyl)imide may be in a range of 1:6 to 1:9 as a molar ratio. For example, in the case in which the mixing ratio of the lithium salt and the lithium bis(fluorosulfonyl)imide is 1:6 or more as a molar ratio, the occurrence of the enormous amount of irreversible reaction during the process of forming the SEI in the lithium-ion battery and the process of intercalating lithium ions, which are solvated by the propylene carbonate and ethylene carbonate, into the negative electrode, may be prevented, and the effects of improving the low-temperature output as well as the cycle characteristics and capacity characteristics after high-temperature storage of the secondary battery may be achieved by suppressing the exfoliation of the negative electrode surface layer (e.g., carbon surface layer) and the decomposition of the electrolyte solution.

An amount of the pyridine-based compound represented by Formula 1 may be adjusted according to the amount of the lithium bis(fluorosulfonyl)imide added.

The lithium bis(fluorosulfonyl)imide and the pyridine-based compound represented by Formula 1 may be used in a weight ratio of 1:0.001 to 1:5, particularly 1:0.005 to 1:3, and more particularly 1:0.01 to 1:2.5.

In case in which the lithium bis(fluorosulfonyl)imide and the pyridine-based compound represented by Formula 1 are used in a weight ratio of 1:0.001 to 1:5, the pyridine-based compound represented by Formula 1 may prevent a side reaction, such as metal dissolution of the positive electrode, and may achieve an effect of improving high-temperature durability due to the formation of the robust SEI on the negative electrode while appropriately suppressing the side reaction in the electrolyte solution during the charge and discharge of the lithium secondary battery at room temperature which may occur due to the addition of the lithium bis(fluorosulfonyl)imide.

Also, the present invention provides a lithium secondary battery including: a positive electrode including a positive electrode active material; a negative electrode including a negative electrode active material; a separator disposed between the positive electrode and the negative electrode; and the non-aqueous electrolyte solution, wherein the positive electrode active material includes a manganese spinel-based active material, a lithium metal oxide, or a mixture thereof.

The lithium metal oxide may be selected from the group consisting of lithium-manganese-based oxide, lithium-nickel-manganese-based oxide, lithium-manganese-cobalt-based oxide, and lithium-nickel-manganese-cobalt-based oxide. Specifically, the positive electrode active material may include $LiCoO_2$, $LiNiO_2$, $LiMnO_2$, $LiMn_2O_4$, $Li_{1+x}(Ni_aCo_bMn_c)O_2$ (where, $0.55 \leq a \leq 0.65$, $0.18 \leq b \leq 0.22$, $0.18 \leq c \leq 0.22$, $-0.2 \leq x \leq 0.2$, and $x+a+b+c=1$), $Li(Ni_{a'}Co_{b'}Mn_{c'})O_2$ (where $0<a'<1$, $0<b'<2$, $0<c'<1$, and $a'+b'+c'=1$), $LiNi_{1-Y}Co_YO_2$ (where $0 \leq Y<1$), $LiCo_{1-Y'}Mn_{Y'}O_2$ (where $0 \leq Y'<1$), $LiNi_{1-Y''}Mn_{Y''}O_2$ (where $0 \leq Y''<1$), $Li(Ni_dCo_eMn_f)O_4$ (where $0<d<2$, $0<e<2$, $0<f<2$, and $d+e+f=2$), $LiMn_{2-z}Ni_zO_4$ (where $0<z<2$), and $LiMn_{2-z'}Co_{z'}O_4$ (where $0<z'<2$).

In an example of the present invention, the lithium metal oxide may be a lithium-nickel-manganese-cobalt-based oxide, and, specifically, the lithium-nickel-manganese-cobalt-based oxide may include an oxide represented by Formula 2 below.

$$Li_{1+x}(Ni_aCo_bMn_c)O_2 \quad \text{[Formula 2]}$$

(in Formula 2, $0.55 \leq a \leq 0.65$, $0.18 \leq b \leq 0.22$, $0.18 \leq c \leq 0.22$, $-0.2 \leq x \leq 0.2$, and $x+a+b+c=1$.)

In a case in which the lithium-nickel-manganese-cobalt-based oxide is used as the positive electrode active material in the positive electrode, the lithium-nickel-manganese-cobalt-based oxide may be combined with the lithium bis(fluorosulfonyl)imide included in the non-aqueous electrolyte solution to have a synergistic effect. With respect to the lithium-nickel-manganese-cobalt-based oxide positive electrode active material, since a phenomenon (cation mixing), in which a position of $Li^{+1}$ ion and a position of $Ni^{+2}$ ion in a layered structure of the positive electrode active material are changed during the charge and discharge as an amount of nickel (Ni) among transition metals is increased, occurs, the structure is collapsed, and, thus, the positive electrode active material may cause a side reaction with the electrolyte solution or a dissolution phenomenon of the transition metal may occur. The reason for this is that sizes of the $Li^{+1}$ ion and the $Ni^{+2}$ ion are similar. Eventually, performance of the battery is easily degraded due to the depletion of the electrolyte solution in the secondary battery caused by the side reaction and the structural collapse of the positive electrode active material.

Thus, in the lithium secondary battery according to an example of the present invention, since the electrolyte solution including LiFSI with the positive electrode active material of Formula 2 is used, a layer is formed of a component from the LiFSI on the surface of the positive electrode, and thus, a sufficient amount of the nickel transition metal for securing capacity of the positive electrode active material may be secured while suppressing the cation mixing phenomenon of the $Li^{+1}$ ion and $Ni^{+2}$ ion. Since the lithium secondary battery according to the example of the present invention includes the electrolyte solution including the LiFSI with the oxide of Formula 2, a side reaction between the electrolyte solution and the positive electrode and the metal dissolution phenomenon may be effectively suppressed.

In a case in which a ratio of the Ni transition metal in the oxide represented by Formula 2 is greater than 0.65 ($a>0.65$), since an excessive amount of the Ni is included in the positive electrode active material, the cation mixing phenomenon of the $Li^{+1}$ ion and $Ni^{+2}$ ion may not be suppressed even by the above-described layer formed of the component from the LiFSI on the surface of the electrode.

Also, in a case in which the excessive amount of the Ni transition metal is included in the positive electrode active material, the nickel transition metal having a orbital in an environment, such as high temperature, depending on the variation of oxidation number of the Ni must have an octahedral structure when coordination bonded, but the order of energy levels may be reversed by external energy supply, or a distorted octahedron may be formed due to the variation of the oxidation number (heterogenization reaction). As a result, since a crystal structure of the positive electrode active material including the nickel transition metal is transformed, the probability of dissolution of the nickel metal in the positive electrode active material is increased.

As a result, the present inventors found that excellent efficiency in high-temperature stability and capacity characteristics is exhibited while generating high output when the positive electrode active material including the oxide in the range according to Formula 2 and the LiFSI salt are combined.

In a case in which the lithium secondary battery according to the example of the present invention includes the oxide represented by Formula 2 as the positive electrode active material, the concentration of the lithium bis(fluorosulfonyl) imide in the non-aqueous electrolyte solution may be in a range of 0.01 mol/L to 2 mol/L, particularly, 0.01 mol/L to 1 mol/L. In a case in which the concentration of the lithium bis(fluorosulfonyl)imide is less than 0.1 mol/L, effects of improving the low-temperature output and high-temperature cycle characteristics of the lithium secondary battery may be insignificant. In a case in which the concentration of the lithium bis(fluorosulfonyl)imide is greater than 2 mol/L, since the side reaction in the electrolyte solution may excessively occur during the charge and discharge of the battery, the swelling phenomenon may occur and the corrosion of the positive electrode or negative electrode collector formed of a metal may occur in the electrolyte solution.

In order to further prevent the side reaction, the non-aqueous electrolyte solution of the present invention may further include a lithium salt in addition to the lithium bis(fluorosulfonyl)imide. Any lithium salt commonly used in the art may be used as the lithium salt, and, for example, the lithium salt may include any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and $LiC_4BO_8$, or a mixture of two or more thereof.

In the case that the lithium secondary battery according to the example of the present invention includes the oxide represented by Formula 2 as the positive electrode active material, the mixing ratio of the lithium salt and the lithium bis(fluorosulfonyl)imide may be in a range of 1:0.01 to 1:1 as a molar ratio. In a case in which the mixing ratio of the lithium salt and the lithium bis(fluorosulfonyl)imide is above the molar ratio range, since the side reaction in the electrolyte solution may excessively occur during the charge and discharge of the battery, the swelling phenomenon may occur, and, in a case in which the mixing ratio is below the molar ratio range, the output of the secondary battery generated may be reduced. Specifically, in a case in which the mixing ratio of the lithium salt and the lithium bis(fluorosulfonyl)imide is less than 1:0.01 as a molar ratio, a large amount of irreversible reaction may occur during the process of forming the SET in the lithium-ion battery and the process of intercalating lithium ions, which are solvated by a carbonate-based solvent, into the negative electrode, and the effects of improving the low-temperature output as well as the cycle characteristics and capacity characteristics after high-temperature storage of the secondary battery may be insignificant due to the exfoliation of the negative electrode surface layer (e.g., carbon surface layer) and the decomposition of the electrolyte solution. In a case in which the mixing ratio of the lithium salt and the lithium bis(fluorosulfonyl)imide is greater than 1:1 as a molar ratio, since an excessive amount of the lithium bis(fluorosulfonyl)imide is included in the electrolyte solution to cause the corrosion of the electrode collector during the charge and discharge, stability of the secondary battery may be affected.

In the case that the lithium secondary battery according to the example of the present invention includes the oxide represented by Formula 2 as the positive electrode active material, the non-aqueous organic solvent may be used without limitation as long as it may minimize the decomposition due to the oxidation reaction during the charge and discharge of the battery and may exhibit desired characteristics with the additive. For example, a nitrile-based solvent, cyclic carbonate, linear carbonate, ester, ether, or ketone may be used as the non-aqueous organic solvent. These materials may be used alone or in combination of two or more thereof.

Specifically, in the case that the lithium secondary battery according to the example of the present invention includes the oxide represented by Formula 2 as the positive electrode active material, acetonitrile-based solvent may be used as the non-aqueous organic solvent, and, in a case in which the lithium-nickel-manganese-cobalt-based oxide, as the positive electrode active material, is used in the positive electrode, side effects due to the reduction of the stability of the high-output battery caused by the combination with the lithium bis(fluorosulfonyl)imide may be effectively prevented by using the acetonitrile-based solvent.

As the negative electrode active material, a carbon-based negative electrode active material, such as crystalline carbon, amorphous carbon, or a carbon composite, may be used alone or in combination of two or more thereof, and, for example, the crystalline carbon may include graphitic carbon such as natural graphite and artificial graphite.

Specifically, in the lithium secondary battery, a slurry is prepared by mixing a predetermined solvent with a mixture of a positive electrode or negative electrode active material, a conductive agent, and a binder, and the positive electrode or negative electrode, for example, may then be prepared by coating a positive electrode or negative electrode collector with the slurry and drying the coated collector.

According to an embodiment of the present invention, the positive electrode collector is generally fabricated to have a thickness of 3 μm to 500 μm. The positive electrode collector is not particularly limited so long as it has high conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode collector may have an uneven surface to improve the adhesion of the positive electrode active material and may have any of various shapes such as that of a film, a sheet, a foil, a net, a porous body, a foam body, a non-woven fabric body, and the like.

The negative electrode collector is generally fabricated to have a thickness of 3 μm to 500 μm. The negative electrode collector is not particularly limited so long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have a fine roughness surface to improve the bond strength of the negative electrode active material. The negative electrode collector may have various shapes such as a film, a sheet, a foil, a net, a porous body, a foam body, a non-woven fabric body, and the like.

The conductive agent used in the positive electrode or negative electrode slurry is typically added in an amount of 1 wt % to 20 wt % based on a total weight of the mixture including the positive electrode or negative electrode active material. Any conductive agent may be used without particular limitation so long as it has conductivity without causing adverse chemical changes in the battery, and, for example, a conductive material, such as: graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive oxide such as titanium oxide; or polyphenylene derivatives, may be used.

The binder, as a component that assists the binding between the positive electrode or negative electrode active material and the conductive agent and the binding with the current collector, is typically added in an amount of 1 wt % to 20 wt % based on the total weight of the mixture including the positive electrode or negative electrode active material. Examples of the binder may include various types of binder polymers, such as polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, and various copolymers.

Also, preferred examples of the solvent may include dimethyl sulfoxide (DMSO), alcohol, N-methyl pyrrolidone (NMP), acetone, or water, and the solvent is removed in a drying process.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator, or typical porous nonwoven fabric, for example, a nonwoven fabric formed of high melting point glass fibers or polyethylene terephthalate fibers may be used as the separator, but the present invention is not limited thereto.

Any battery case typically used in the art may be selected as a battery case used in the present invention. A shape of the lithium secondary battery according to the use thereof is not limited, and for example, a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells. Preferred examples of the medium and large sized device may be an electric vehicle, a hybrid electric vehicle, a plug-in hybrid electric vehicle, or a power storage system, but the medium and large sized device is not limited thereto.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Hereinafter, the present invention will be described in more detail, according to examples and experimental examples. However, the present invention is not limited thereto.

Example 1

[Preparation of Non-aqueous Electrolyte Solution]

A non-aqueous electrolyte solution was prepared by adding 0.1 mol/L of $LiPF_6$, as a lithium salt, 0.9 mol/L of lithium bis(fluorosulfonyl)imide, and 1 wt % of the compound of Formula 1 based on a total weight of the non-aqueous electrolyte solution to a non-aqueous organic solvent having a composition in which a volume ratio of propylene carbonate (PC):ethylene carbonate (EC):ethylmethyl carbonate (EMC) was 3:3:4.

[Preparation of Lithium Secondary Battery]

A positive electrode mixture slurry was prepared by adding 96 wt % of a mixture of $LiMn_2O_4$ and $Li(Ni_{0.33}Co_{0.33}Mn_{0.33})O_2$ as a positive electrode active material, 2 wt % of carbon black as a conductive agent, and 2 wt % of polyvinylidene fluoride (PVdF) as a binder to N-methyl-2-pyrrolidone (NMP) as a solvent. An about 20 μm thick aluminum (Al) thin film, as a positive electrode collector, was coated with the positive electrode mixture slurry and dried, and the coated Al thin film was then roll-pressed to prepare a positive electrode.

Also, a negative electrode mixture slurry was prepared by adding 96 wt % of carbon powder as a negative electrode active material, 3 wt % of PVdF as a binder, and 1 wt % of carbon black as a conductive agent to NMP as a solvent. A 10 μm thick copper (Cu) thin film, as a negative electrode collector, was coated with the negative electrode mixture slurry and dried, and the coated Cu thin film was then roll-pressed to prepare a negative electrode.

A polymer type battery was prepared by a typical method using a separator formed of three layers of polypropylene/polyethylene/polypropylene (PP/PE/PP) with the positive electrode and negative electrode thus prepared, and a lithium secondary battery was then completed by injecting the prepared non-aqueous electrolyte solution.

Example 2

A non-aqueous electrolyte solution and a lithium secondary battery were prepared in the same manner as in Example 1 except that 0.14 mol/L of $LiPF_6$ and 0.86 mol/L of lithium bis(fluorosulfonyl)imide (molar ratio of about 1:6) were used.

Example 3

A non-aqueous electrolyte solution and a lithium secondary battery were prepared in the same manner as in Example 1 except that 0.17 mol/L of $LiPF_6$ and 0.83 mol/L of lithium bis(fluorosulfonyl)imide (molar ratio of about 1:5) were used.

Example 4

A non-aqueous electrolyte solution and a lithium secondary battery were prepared in the same manner as in Example 1 except that 0.5 wt % of the compound of Formula 1 was used.

Example 5

A non-aqueous electrolyte solution and a lithium secondary battery were prepared in the same manner as in Example 2 except that 0.5 wt % of the compound of Formula 1 was used.

Example 6

A non-aqueous electrolyte solution and a lithium secondary battery were prepared in the same manner as in Example 2 except that 3 wt % of the compound of Formula 1 was used.

Comparative Example 1

A non-aqueous electrolyte solution and a lithium secondary battery were prepared in the same manner as in Example 1 except that ethylene carbonate (EC) was not used and a non-aqueous organic solvent having a composition, in which a volume ratio of propylene carbonate (PC):ethylmethyl carbonate (EMC) was 3:7, was used.

Comparative Example 2

A non-aqueous electrolyte solution and a lithium secondary battery were prepared in the same manner as in Example 1 except that propylene carbonate (PC) was not used and a non-aqueous organic solvent having a composition, in which a volume ratio of ethylene carbonate (EC):ethylmethyl carbonate (EMC) was 3:7, was used.

Comparative Example 3

A non-aqueous electrolyte solution and a lithium secondary battery were prepared in the same manner as in Example 1 except that LiFSI and ortho-terphenyl were not used.

Comparative Example 4

A non-aqueous electrolyte solution and a lithium secondary battery were prepared in the same manner as in Example 1 except that LiFSI was not used.

Comparative Example 5

A non-aqueous electrolyte solution and a lithium secondary battery were prepared in the same manner as in Example 1 except that the compound of Formula 1 was not used.

Experimental Example 1

<Measurement of Capacity After High-Temperature Storage>

The lithium secondary batteries of Examples 1 to 6 and Comparative Examples 1 to 5 were charged at 1 C to 4.2 V/38 mA under a constant current/constant voltage (CC/CV) condition at room temperature and then discharged at a constant current (CC) of 2 C to a voltage of 2.5 V to measure discharge capacities, and the discharge capacities were set as capacities at week 0. Next, after storing the lithium secondary batteries of Examples 1 to 6 and Comparative Examples 1 to 5 at 60° C. for 18 weeks, the lithium secondary batteries were again charged at 1 C to 4.2 V/38 mA under a constant current/constant voltage (CC/CV) condition at room temperature and then discharged at a constant current (CC) of 2 C to a voltage of 2.5 V to measure discharge capacities, and the discharge capacities were set as capacities after 18 weeks.

Capacity after high-temperature storage was calculated by an equation: capacity after 18 weeks/capacity at week 0×100, and percent (%) values thus obtained are presented in Table 1 below.

Experimental Example 2

<Measurement of Output After High-Temperature Storage>

Outputs were calculated from voltage differences which were generated by discharging the lithium secondary batteries of Examples 1 to 6 and Comparative Examples 1 to 5 at 5 C for 10 seconds at a state of charge (SOC) of 50% at room temperature, and the outputs were set as outputs at week 0. Next, after storing the lithium secondary batteries of Examples 1 to 6 and Comparative Examples 1 to 5 at 60° C. for 18 weeks, outputs were calculated from voltage differences which were generated by discharging the lithium secondary batteries at 5 C for 10 seconds at a SOC of 50% at room temperature, and the outputs were set as outputs after 18 weeks. Output after high-temperature storage was calculated by an equation: output after 18 weeks/output at week 0×100, and percent (%) values thus obtained are presented in Table 1 below.

Experimental Example 3

<Measurement of Battery Thickness Increase Rate>

Thicknesses of the lithium secondary batteries of Examples 1 to 6 and Comparative Examples 1 to 5 were measured, thicknesses after storing the lithium secondary batteries at 60° C. for 18 weeks were measured, and a battery thickness increase rate was calculated by an equation: (thickness after 18 weeks/thickness at week 0×100)−100, and percent (%) values thus obtained are presented in Table 1 below.

Experimental Example 4

<Measurement of Room-Temperature Lifetime>

The lithium secondary batteries of Examples 1 to 6 and Comparative Examples 1 to 5 were charged at 1 C to 4.2 V/38 mA at 25° C. under a constant current/constant voltage (CC/CV) condition and then discharged at a constant current (CC) of 2 C to a voltage of 2.5 V to measure discharge capacities. The charge and discharge were repeated 1 to 1,000 cycles, and values, which were calculated by an equation: (capacity after the $1,000^{th}$ cycle/capacity after the $1^{st}$ cycle)×100, are presented as room-temperature life characteristics in Table 1 below.

Experimental Example 5

<Measurement of High-Temperature Lifetime>

The lithium secondary batteries of Examples 1 to 6 and Comparative Examples 1 to 5 were charged at 1 C to 4.2 V/38 mA at 45° C. under a constant current/constant voltage (CC/CV) condition and then discharged at a constant current (CC) of 2 C to a voltage of 2.5 V to measure discharge capacities. The charge and discharge were repeated 1 to 1,000 cycles, and values, which were calculated by an equation: (capacity after the $1,000^{th}$ cycle/capacity after the $1^{st}$ cycle)×100, are presented as high-temperature life characteristics in Table 1 below.

TABLE 1

| | LiPF$_6$:LiFSI | Additive (wt %) | High-temperature storage characteristics (%) | | | Life characteristics (%) | |
| --- | --- | --- | --- | --- | --- | --- | --- |
| | | | Capacity | Output | Battery thickness increase | Room temperature | High temperature |
| Example 1 | 1:9 | 1 | 83.1 | 90.2 | 5.4 | 84.3 | 78.7 |
| Example 2 | 1:6 | 1 | 84.8 | 91.6 | 5.7 | 86.9 | 81.2 |
| Example 3 | 1:5 | 1 | 84.4 | 89.9 | 6.3 | 83.5 | 78.5 |
| Example 4 | 1:9 | 0.5 | 83.8 | 92.1 | 6.7 | 84.7 | 80.4 |
| Example 5 | 1:6 | 0.5 | 84.6 | 92.0 | 6.6 | 86.4 | 82.3 |
| Example 6 | 1:6 | 3 | 80.8 | 64.5 | 10.0 | 67.5 | 62.8 |
| Comparative Example 1 | 1:9 | 1 | 75.2 | 78.8 | 14.8 | 77.8 | 75.2 |
| Comparative Example 2 | 1:9 | 1 | 76.8 | 79.1 | 23.7 | 80.6 | 77.1 |
| Comparative Example 3 | 1:0 | 0 | 68.7 | 69.9 | 21.8 | 69.7 | 62.8 |
| Comparative Example 4 | 1:0 | 1 | 70.7 | 79.1 | 20.2 | 78.6 | 71.7 |
| Comparative Example 5 | 1:9 | 0 | 79.7 | 83.7 | 10.2 | 80.4 | 78.0 | in Table 1, the additive represents the pyridine-based compound of Formula 1.

As confirmed from Table 1, since the lithium secondary batteries of Examples 1 to 6 included the lithium bis(fluorosulfonyl)imide and the pyridine-based compound as well as the non-aqueous organic solvent including propylene carbonate (PC) and ethylene carbonate (EC), may be confirmed that the lithium secondary batteries of Examples 1 to 6 exhibited high capacity and output even after the high-temperature storage, excellent high-temperature storage characteristics due to a low battery thickness increase rate, and excellent life characteristics by maintaining high capacity even after the 1,000 cycles at room temperature and high temperature in comparison to the lithium secondary batteries of Comparative Example 1, which did not include the ethylene carbonate (EC) in the non-aqueous organic solvent, Comparative Example 2, which did not include the propylene carbonate (PC) in the non-aqueous organic solvent, Comparative Example 3, which did not include the lithium bis(fluorosulfonyl)imide and the pyridine-based compound, and Comparative Example 4 which did not include the lithium bis(fluorosulfonyl)imide.

When examining effects due to the addition of the lithium bis(fluorosulfonyl)imide, in a case in which the lithium secondary batteries of Example 1 and Comparative Example 4, in which there was a difference whether or not the lithium bis(fluorosulfonyl)imide was added, were compared, it may be confirmed that the lithium secondary battery of Example 1 exhibited significantly better high-temperature storage characteristics and life characteristics due to the addition of the lithium bis(fluorosulfonyl)imide. Also, when examining effects due to the amount of the lithium bis(fluorosulfonyl)imide added, the lithium secondary battery of Example 1, in which the ratio of LiPF$_6$:LiFSI was 1:9, exhibited better high-temperature storage characteristics and life characteristics than the lithium secondary battery of Example 3 in which the ratio of LiPF$_6$:LiFSI was 1:5. Furthermore, it may be confirmed that the lithium secondary battery of Example 2, in which the ratio of LiPF$_6$:LiFSI was 1:6, exhibited overall excellent high-temperature storage characteristics and life characteristics except that the lithium secondary battery of Example 2 exhibited slightly degraded room-temperature life characteristics in comparison to the lithium secondary battery of Example 3.

Also, when examining effects due to the addition of the pyridine-based compound, in a case in which the lithium secondary batteries of Examples 1 and 4 and Comparative Example 5, in which there was a difference whether or not the pyridine-based compound was added, were compared, it may be confirmed that the lithium secondary batteries of Examples 1 and 4 exhibited better high-temperature storage characteristics and life characteristics due to the addition of the compound of Formula 1 and had a significantly lower battery thickness increase rate.

When examining effects due to the amount of the pyridine-based compound added, Examples 1 to 5, in which the compound of Formula 1 was included in an amount of 0.5 wt % to 1 wt % based on the total weight of the non-aqueous electrolyte solution, had better effects than Example 6 in which 3 wt % of the compound of Formula 1 was included.

Example 7

[Preparation of Electrolyte Solution]

A non-aqueous electrolyte solution was prepared by adding 0.9 mol/L of LiPF$_6$, as a lithium salt, 0.1 mol/L of lithium bis(fluorosulfonyl)imide, and 1 wt % of the compound of Formula 1 based on a total weight of the non-aqueous electrolyte solution to a non-aqueous organic solvent having a composition in which a volume ratio of ethylene carbonate (EC):ethylmethyl carbonate (ENC) was 3:7.

[Preparation of Lithium Secondary Battery]

A positive electrode mixture slurry was prepared by adding 92 wt % of Li(Ni$_{0.6}$Co$_{0.2}$Mn$_{0.2}$)O$_2$ as a positive electrode active material, 4 wt % of carbon black as a conductive agent, and 4 wt % of polyvinylidene fluoride (PVdF) as a binder to N-methyl-2-pyrrolidone (NMP) as a solvent. An about 20 μm thick aluminum (Al) thin film, as a positive electrode collector, was coated with the positive electrode mixture slurry and dried, and the coated Al thin film was then roll-pressed to prepare a positive electrode.

Also, a negative electrode mixture slurry was prepared by adding 96 wt % of carbon powder as a negative electrode active material, 3 wt % of PVdF as a binder, and 1 wt % of carbon black as a conductive agent to NMP as a solvent. A 10 μm thick copper (Cu) thin film, as a negative electrode collector, was coated with the negative electrode mixture slurry and dried, and the coated Cu thin film was then roll-pressed to prepare a negative electrode.

A polymer type battery was prepared by a typical method using a separator formed of three layers of polypropylene/polyethylene/polypropylene (PP/PE/PP) with the positive electrode and negative electrode thus prepared, and a lithium secondary battery was then completed by injecting the prepared non-aqueous electrolyte solution.

Example 8

A non-aqueous electrolyte solution and a lithium secondary battery were prepared in the same manner as in Example 7 except that 0.7 mol/L of $LiPF_6$ and 0.3 mol/L of lithium bis(fluorosulfonyl)imide were used.

Example 9

A non-aqueous electrolyte solution and a lithium secondary battery were prepared in the same manner as in Example 7 except that 0.6 mol/L of $LiPF_6$ and 0.4 mol/L of lithium bis(fluorosulfonyl)imide were used.

Example 10

A non-aqueous electrolyte solution and a lithium secondary battery were prepared in the same manner as in Example 7 except that 0.5 mol/L of $LiPF_6$ and 0.5 mol/L of lithium bis(fluorosulfonyl)imide were used.

Example 11

A non-aqueous electrolyte solution and a lithium secondary battery were prepared in the same manner as in Example 7 except that 3 wt % of the compound of Formula 1 was used.

Comparative Example 6

A non-aqueous electrolyte solution and a lithium secondary battery were prepared in the same manner as in Example 7 except that 0.4 mol/L of $LiPF_6$ and 0.6 mol/L of lithium bis(fluorosulfonyl)imide were used.

Comparative Example 7

A non-aqueous electrolyte solution and a lithium secondary battery were prepared in the same manner as in Example 8 except that the compound of Formula 1 was not used.

Comparative Example 8

A non-aqueous electrolyte solution and a lithium secondary battery were prepared in the same manner as in Example 8 except that $Li(Ni_{0.5}Co_{0.3}Mn_{0.2})O_2$ was used as the positive electrode active material.

Comparative Example 9

A non-aqueous electrolyte solution and a lithium secondary battery were prepared in the same manner as in Example 8 except that $Li(Ni_{0.8}Co_{0.1}Mn_{0.1})O_2$ was used as the positive electrode active material.

Comparative Example 10

A non-aqueous electrolyte solution and a lithium secondary battery were prepared in the same manner as in Example 8 except that $LiCoO_2$ was used as the positive electrode active material.

Experimental Example 6

<Measurement of High-Temperature Lifetime>

The lithium secondary batteries of Examples 7 to 11 and Comparative Examples 6 to 10 were charged at 1 C to 4.2 V/38 mA at 45° C. under a constant current/constant voltage (CC/CV) condition and then discharged at a constant current (CC) of 2 C to a voltage of 2.5 V to measure discharge capacities. The charge and discharge were repeated 1 to 1,000 cycles, and values, which were calculated by an equation: (capacity after the $1,000^{th}$ cycle/capacity after the $1^{st}$ cycle)×100, are presented as high-temperature life characteristics in Table 2 below.

Experimental Example 7

<Capacity Characteristics After High-Temperature Storage>

The secondary batteries prepared in Examples 7 to 11 and Comparative Examples 6 to 10 were charged at 1 C to 4.2 V/38 mA under a constant current/constant voltage (CC/CV) condition and then discharged at a constant current (CC) of 2 C to a voltage of 2.5 V to measure discharge capacities. Next, after storing the secondary batteries at 60° C. for 16 weeks, the secondary batteries were again charged at 1 C to 4.2 V/38 mA under a constant current/constant voltage (CC/CV) condition at room temperature and then discharged at a constant current (CC) of 2 C to a voltage of 2.5 V to measure discharge capacities. The discharge capacity after 16 weeks was calculated as a percentage based on the initial discharge capacity (discharge capacity after 16 weeks/initial discharge capacity×100(%)), and the results thereof are presented in Table 2 below.

Experimental Example 8

<Output Characteristics After High-Temperature Storage>

After storing the secondary batteries prepared in Examples 7 to 11 and Comparative Examples 6 to 10 at 60° C. for 16 weeks, outputs were calculated from voltage differences which were generated by charging and discharging the secondary batteries at 5 C for 10 seconds at room temperature. The output after 16 weeks was calculated as a percentage based on the initial output (output (W) after 16 weeks/initial output (W)×100(%)), and the results thereof are presented in Table 2 below. The experiment was performed at a state of charge (SOC) of 50%.

Experimental Example 9

<Measurement of Battery Thickness Increase Rate>

Thicknesses of the secondary batteries prepared in Examples 7 to 11 and Comparative Examples 6 to 10 were measured, thicknesses after storing the secondary batteries at 60° C. for 16 weeks were measured, and values, which were calculated by an equation: (thickness after 16 weeks/thickness at week 0×100)−100, are presented as battery thickness increase rates in Table 2 below.

TABLE 2

| | Positive electrode active material | Additive LiPF$_6$:LiFSI | High-temperature (wt %) | High-temperature lifetime (%) | High-temperature storage characteristics (%) | | |
|---|---|---|---|---|---|---|---|
| | | | | | Capacity | Output | Thickness |
| Example 7 | NMC622 | 9:1 | 1 | 84.8 | 89.9 | 95.4 | 5.3 |
| Example 8 | NMC622 | 7:3 | 1 | 89.2 | 92.8 | 96.7 | 4.1 |
| Example 9 | NMC622 | 6:4 | 1 | 87.6 | 91.4 | 96.8 | 4.9 |
| Example 10 | NMC622 | 5:5 | 1 | 86.7 | 90.9 | 94.2 | 5.2 |
| Example 11 | NMC622 | 3:7 | 3 | 71.2 | 76.9 | 71.3 | 24.4 |
| Comparative Example 6 | NMC622 | 4:6 | 1 | 83.1 | 88.7 | 95.2 | 6.1 |
| Comparative Example 7 | NMC622 | 7:3 | 0 | 75.6 | 84.1 | 92.4 | 19.7 |
| Comparative Example 8 | NMC532 | 7:3 | 1 | 71.7 | 80.5 | 88.6 | 31.8 |
| Comparative Example 9 | NMC811 | 7:3 | 1 | 65.1 | 65.9 | 70.8 | 34.7 |
| Comparative Example 10 | LiCoO$_2$ | 7:3 | 1 | 70.4 | 83.4 | 78.5 | 20.4 |

In Table 2, NMC622 represents Li(Ni$_{0.6}$Co$_{0.2}$Mn$_{0.2}$)O$_2$, NMC532 represents Li(Ni$_{0.5}$Co$_{0.3}$Mn$_{0.2}$)O$_2$, NMC811 represents Li(Ni$_{0.8}$Co$_{0.1}$Mn$_{0.1}$)O$_2$, and the additive represents the compound of Formula 1.

When examining Table 2, it may be confirmed that the secondary batteries of Examples 7 to 10, in which Li(Ni$_{0.6}$Co$_{0.2}$Mn$_{0.2}$)O$_2$ was included as the positive electrode active material and the mixing ratio of the lithium salt and the lithium bis(fluorosulfonyl)imide was in a range of 1:0.01 to 1:1, had better high-temperature storage characteristics and high-temperature lifetime than the secondary batteries of Comparative Examples 8 and 9 in which Li(Ni$_{0.5}$Co$_{0.3}$Mn$_{0.2}$)O$_2$ or Li(Ni$_{0.8}$Co$_{0.1}$Mn$_{0.1}$)O$_2$ was included as the positive electrode active material.

When comparing Example 8 and Comparative Example 7 from the viewpoint of whether or not the pyridine-based compound was added, the secondary battery of Example 8, which included the non-aqueous electrolyte solution including the compound of Formula 1 as the pyridine-based compound, had better high-temperature lifetime and high-temperature storage characteristics than Comparative Example 7 including the non-aqueous electrolyte solution without the compound of Formula 1.

The invention claimed is:

1. A non-aqueous electrolyte solution comprising:
a non-aqueous organic solvent;
lithium bis(fluorosulfonyl)imide (LiFSI); and
a pyridine-based compound represented by Formula 1:

[Formula 1]

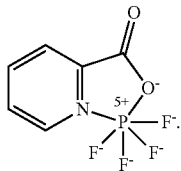

2. The non-aqueous electrolyte solution of claim 1, wherein an amount of the pyridine-based compound represented by Formula 1 is in a range of 0.01 wt % to 3 wt % based on a total weight of the non-aqueous electrolyte solution.

3. The non-aqueous electrolyte solution of claim 1, wherein the lithium bis(fluorosulfonyl)imide and the pyridine-based compound represented by Formula 1 are included in a weight ratio of 1:0.001 to 1:5.

4. The non-aqueous electrolyte solution of claim 1, wherein the non-aqueous organic solvent comprises propylene carbonate (PC) and ethylene carbonate (EC),
wherein a mixing ratio of the propylene carbonate and the ethylene carbonate is in a range of 1:0.1 to 1:2 as a weight ratio.

5. The non-aqueous electrolyte solution of claim 4, wherein the non-aqueous organic solvent further comprises one selected from the group consisting of ethyl propionate (EP), methyl propionate (MP), butylene carbonate (BC), dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

6. The non-aqueous electrolyte solution of claim 4, wherein the non-aqueous electrolyte solution further comprises a lithium salt in addition to the lithium bis(fluorosulfonyl)imide,
wherein a mixing ratio of the lithium salt in addition to the lithium bis(fluorosulfonyl)imide and the lithium bis(fluorosulfonyl)imide is in a range of 1:1 to 1:9 as a molar ratio.

7. The non-aqueous electrolyte solution of claim 6, wherein the lithium salt in addition to the lithium bis(fluorosulfonyl)imide comprises one selected from the group consisting of LiPF$_6$, LiBF$_4$, LiSbF$_6$, LiAsF$_6$, LiClO$_4$, LiN(C$_2$F$_5$SO$_2$)$_2$, LiN(CF$_3$SO$_2$)$_2$, CF$_3$SO$_3$Li, LiC(CF$_3$SO$_2$)$_3$, and LiC$_4$BO$_8$, or a mixture of two or more thereof.

8. The non-aqueous electrolyte solution of claim 4, wherein an amount of the propylene carbonate is in a range of 5 parts by weight to 60 parts by weight based on 100 parts by weight of the total non-aqueous organic solvent.

9. The non-aqueous electrolyte solution of claim 4, wherein the lithium bis(fluorosulfonyl)imide has a concentration of 0.1 mol/L to 2 mol/L in the non-aqueous electrolyte solution.

10. A lithium secondary battery comprising,
a positive electrode including a positive electrode active material;
a negative electrode including a negative electrode active material;

a separator disposed between the positive electrode and the negative electrode; and the non-aqueous electrolyte solution of claim 1, wherein the positive electrode active material comprises a manganese spinel-based active material, a lithium metal oxide, or a mixture thereof.

11. The lithium secondary battery of claim 10, wherein the lithium metal oxide is selected from the group consisting of lithium-manganese-based oxide, lithium-nickel-manganese-based oxide, lithium-manganese-cobalt-based oxide, and lithium-nickel-manganese-cobalt-based oxide.

12. The lithium secondary battery of claim 10, wherein the lithium metal oxide is a lithium-nickel-manganese-cobalt-based oxide, and the lithium-nickel-manganese-cobalt-based oxide comprises an oxide represented by Formula 2:

$$Li_{1+x}(Ni_aCo_bMn_c)O_2 \quad \text{[Formula 2]}$$

wherein, in Formula 2, $0.55 \leq a \leq 0.65$, $0.18 \leq b \leq 0.22$, $0.18 \leq c \leq 0.22$, $-0.2 \leq x \leq 0.2$, and $x+a+b+c=1$.

13. The lithium secondary battery of claim 12, wherein the non-aqueous electrolyte solution further comprises a lithium salt in addition to the lithium bis(fluorosulfonyl)imide, wherein a mixing ratio of the lithium salt in addition to the lithium bis(fluorosulfonyl)imide and the lithium bis(fluorosulfonyl)imide is in a range of 1:0.01 to 1:1 as a molar ratio.

14. The lithium secondary battery of claim 13, wherein the lithium salt in addition to the lithium bis(fluorosulfonyl) imide comprises one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and $LiC_4BO_8$, or a mixture of two or more thereof.

15. The lithium secondary battery of claim 12, wherein the lithium bis(fluorosulfonyl)imide has a concentration of 0.01 mol/L to 2 mol/L in the non-aqueous electrolyte solution.

16. The lithium secondary battery of claim 12, wherein the non-aqueous organic solvent comprises a nitrile-based solvent, linear carbonate, cyclic carbonate, ester, ether, ketone, or a combination thereof.

17. The lithium secondary battery of claim 16, wherein the cyclic carbonate comprises one selected from the group consisting of ethylene carbonate (EC), propylene carbonate (PC), and butylene carbonate (BC), or a mixture of two or more thereof, and the linear carbonate comprises one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixture of two or more thereof.

18. The lithium secondary battery of claim 16, wherein the nitrile-based solvent comprises at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

* * * * *